United States Patent [19]

Bazzi et al.

[11] Patent Number: 5,792,023

[45] Date of Patent: Aug. 11, 1998

[54] RANGE ENGAGEMENT IN RESPONSE TO MOVEMENT OF A RANGE SELECTOR LEVER FOR AN AUTOMATIC TRANSMISSION

[75] Inventors: Rafic Bazzi, Dearborn; Michael Lee Kulhanek, Clinton Twp.; Samuel Vann, Royal Oak, all of Mich.

[73] Assignee: Ford Global Technologies, Inc., Dearborn, Ill.

[21] Appl. No.: 795,998

[22] Filed: Feb. 5, 1997

[51] Int. Cl.$^6$ ............................................. F16H 61/02
[52] U.S. Cl. ................................... 477/116; 477/115
[58] Field of Search ................................... 477/115, 116, 477/117, 77, 62; 701/51, 55, 58, 64, 66

[56] References Cited

U.S. PATENT DOCUMENTS

| | | | |
|---|---|---|---|
| 4,984,485 | 1/1991 | Kojima et al. | 477/116 |
| 5,090,270 | 2/1992 | Suzuki | 477/117 |
| 5,165,308 | 11/1992 | Asada et al. | 701/51 X |
| 5,329,830 | 7/1994 | Kitagawa et al. | 477/117 |
| 5,505,672 | 4/1996 | Sakai et al. | 477/117 |
| 5,558,599 | 9/1996 | Tsukamoto et al. | 477/116 |
| 5,655,993 | 8/1997 | Fujimoto et al. | 477/116 |

Primary Examiner—Charles A. Marmor
Assistant Examiner—Scott Lund
Attorney, Agent, or Firm—Frank G. McKenzie

[57] ABSTRACT

A method for controlling engagement of an automatic transmission in response to manual operation of a gear shift lever by the vehicle operator includes determining the instantaneous position of the PRNDL shift lever and checking whether that position has changed since the last execution of the control algorithm. Next the method determines whether the gear shift lever has moved from the neutral position to the drive position or whether it is moved from the drive position to the neutral position since the last execution of the program. In response to these checks, various flags are set and an engagement timer is loaded to a predetermined period. Finally the method passes the shift lever position to a microprocessor depending on the state of the flags, expiration of the timer and the vehicle speed or turbine speed.

8 Claims, 5 Drawing Sheets

| PRNDL | OD CANCEL | GEAR | SS1 | SS2 | SS3 |
|---|---|---|---|---|---|
| OD | OFF | 1 | OFF | ON | OFF |
|  | OFF | 2 | ON | ON | OFF |
|  | OFF | 3 | OFF | OFF | ON |
|  | OFF | 4 | ON | OFF | ON |
| "O" | ON | 1 | OFF | ON | OFF |
|  | ON | 2 | ON | ON | OFF |
|  | ON | 3 | OFF | OFF | OFF |
|  |  | 4 |  |  |  |
| 1 |  | 1 | OFF | ON | — |
|  |  | 2 | OFF | OFF | — |
|  |  | 3 |  |  |  |
|  |  | 4 |  |  |  |
| R |  | R | — | — | OFF |

| TOT | FNTSSENG |
|---|---|
| −100 | 650 |
| 32 | 650 |
| 33 | 320 |
| 150 | 150 |

RANGE ENGAGEMENT IN RESPONSE TO MOVEMENT OF A RANGE SELECTOR LEVER FOR AN AUTOMATIC TRANSMISSION

FIELD OF THE INVENTION

This invention relates to the field of controls of the operation of automatic transmissions for motor vehicles. More particularly the invention pertains to gear ratio changes resulting from movement of a range selector lever.

DESCRIPTION OF THE PRIOR ART

Automatic transmissions are required to engage selected operating ranges when a PRNDL range selector lever is moved among park, reverse, neutral and various forward drive positions.

Frequently when the vehicle operator shifts directly from reverse to drive or drive to reverse without pausing briefly in the neutral position, the transmission control will not recognize that the vehicle operator is commanding range changes manually. Consequently harsh gear engagements result because the control strategy does not permit proper timing of the solenoids that control the shift valves that produce the gear ratios of the selected range.

When the vehicle operator shifts the PRNDL lever from reverse or park to any of several forward drive positions, or from drive to reverse or park without momentarily pausing in the neutral position, the neutral-to-drive transition will not be recognized and a suitable engagement flag will not be set when operating according to a conventional shift control strategy. The current filtered and delayed PRNDL lever position PDL transition will not be accurately recognized. The PDL change should occur when the desired turbine speed is less than a calibrated rotational speed. However, the transition occurs much earlier than if it were controlled by the desired turbine speed, and results in a very harsh engagement of the transmission.

By using a raw voltage input from the PRNDL lever and an increased sampling and execution frequency, the proper timing of shift solenoid changes can be achieved without the driver momentarily pausing in the neutral position when shifting between forward drive and reverse drive ranges.

SUMMARY OF THE INVENTION

In order to achieve proper timing of the shift solenoid configuration changes, both a neutral-drive flag and a drive-neutral flag need to be recognized when the range selection lever passes through the neutral position, regardless of whether the neutral position is maintained momentarily or instantaneously. This can be accomplished by replacing the delayed filtered PRNDL lever position by the instantaneous PRNDL lever position, and by executing the control strategy at a faster rate (about 25 ms.) than the period of the background loop, which is typically about 50 ms.

In realizing these advantages and objects the method according to this invention for controlling gear engagements of an automatic transmission in response to movement of a range selection lever, includes the steps of continually determining at frequent intervals the position of the range selection lever; initiating a first interval timer for a first predetermined period upon a change in position of the range selection lever since the last interval; initiating a second interval timer for a second predetermined period upon a change in position of the range selection lever from a predetermined position; on the occurrence of a change in position of the range selection lever from a predetermined position, producing a first indication of said change in position; initiating the second interval timer for a second predetermined period upon a change in position of the range selection lever to the predetermined position; on the occurrence of a change in position of the range selection lever to the predetermined position, producing a second indication of said change in position; and changing the operating range of the transmission to the range corresponding to the first and second indications upon expiration of the first interval timer if the second interval timer has expired.

DESCRIPTION OF THE PREFERRED EMBODIMENT

Figure 1:
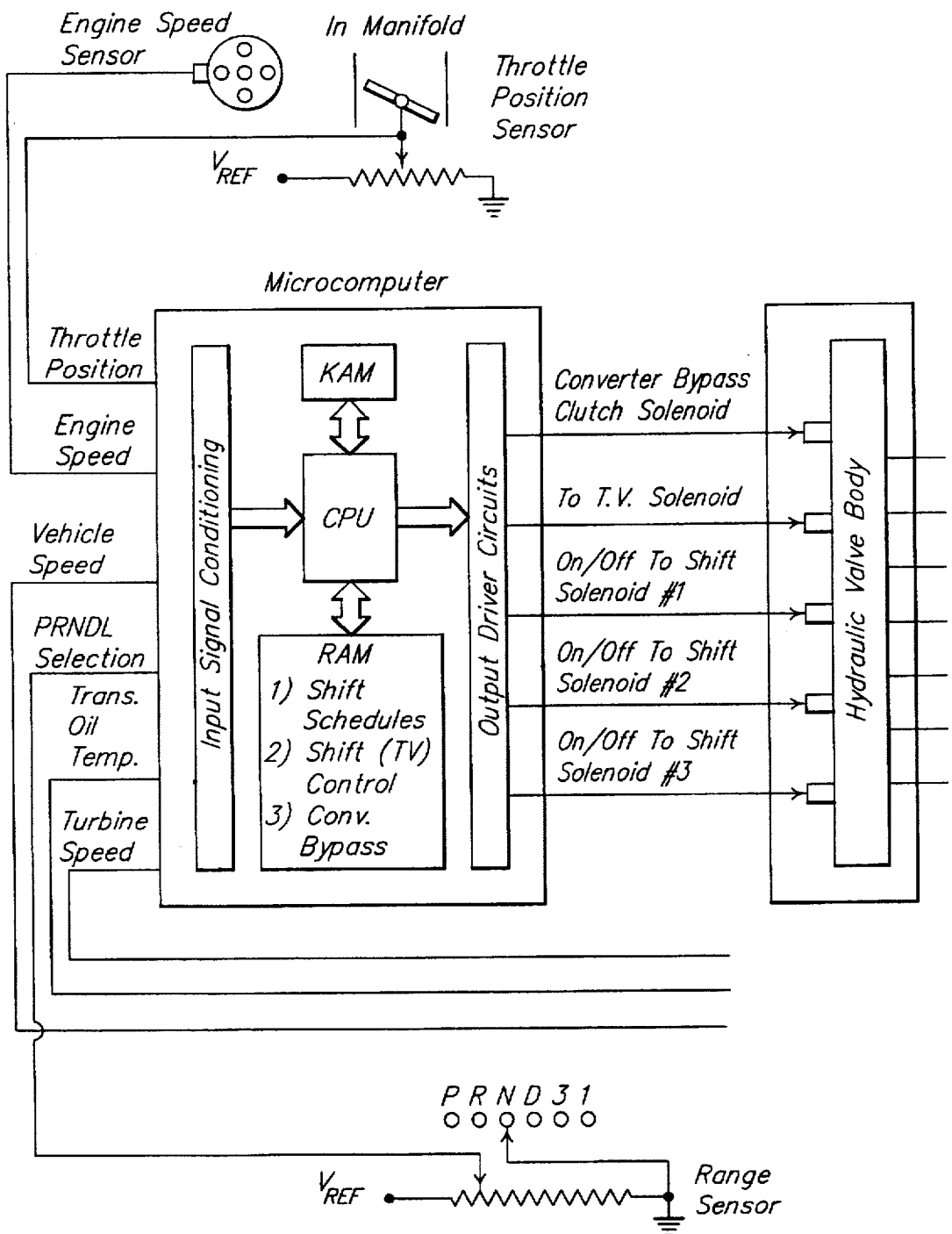
FIG. 1 is a schematic representation of a microprocessor including input signals representing the state of various operating parameters and output signals applied to the shift solenoids of a hydraulic valve body, which control operation of the transmission.

FIG. 1 shows a schematic diagram of a microcomputer circuit and valve system. Various sensors produce signals representing the state of the sensors or the magnitude of various operating parameters. These signals are received by input signal conditioning circuits where analog signals are converted to digital signals and noise is filtered. Various buses carry signals among permanent memory in the form of keep-alive memory (KAM) and read only memory (ROM), a central processing unit, relatively volatile, random access memory (RAM), input conditioning circuits, and output driver circuits. Gearshift schedules, calibration constants, functions and tables are stored in permanent or volatile memory; however, current values for operating parameters are stored generally in ROM. The output driver circuits receive signals from the central processing unit on computer and produce electronic control signals as outputs applied to the solenoids of electromagnetically operated valves located in the hydraulic valve body. The output signals are sent to three solenoid valves (SS1, SS2, SS3), a variable force throttle valve (TV) solenoid and a torque converter bypass clutch solenoid.

A vehicle speed sensor produces a signal representing the speed of the transmission output shaft. The speed of the torque converter turbine is represented by a signal produced by a turbine speed sensor. The engine throttle position, i.e., the extent to which the engine throttle opens the intake manifold, is represented by a signal produced by a throttle position sensor. An algorithm produces gear ratio changes in the transmission by producing signals in accordance with control logic stored in ROM to selectively energize and deenergize the shift solenoid valves, which selectively engage and disengage clutches and brakes of the transmission to produce the various gear ratios.

Figures 2, 3, 4:
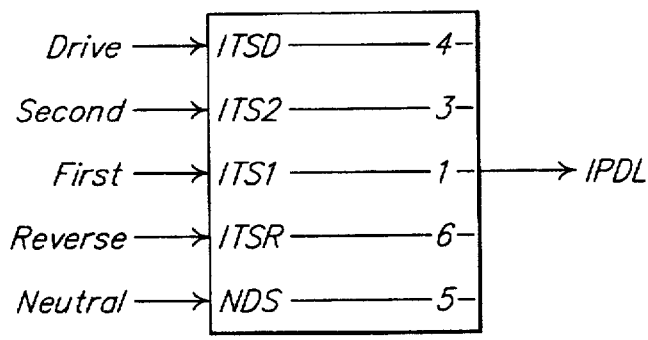
FIG. 2 is a chart showing the energized and deenergized states of three solenoid-operated shift valves of the hydraulic control circuit.
FIG. 3 shows the IPDL logic relating the variable IPDL and the position of the range selection lever. This logic is executed approximately every 25 msec.
FIG. 4 is a function table showing the relationship between transmission oil temperature TOT and turbine speed engagement, FNTSSENG.
Figure 3A:
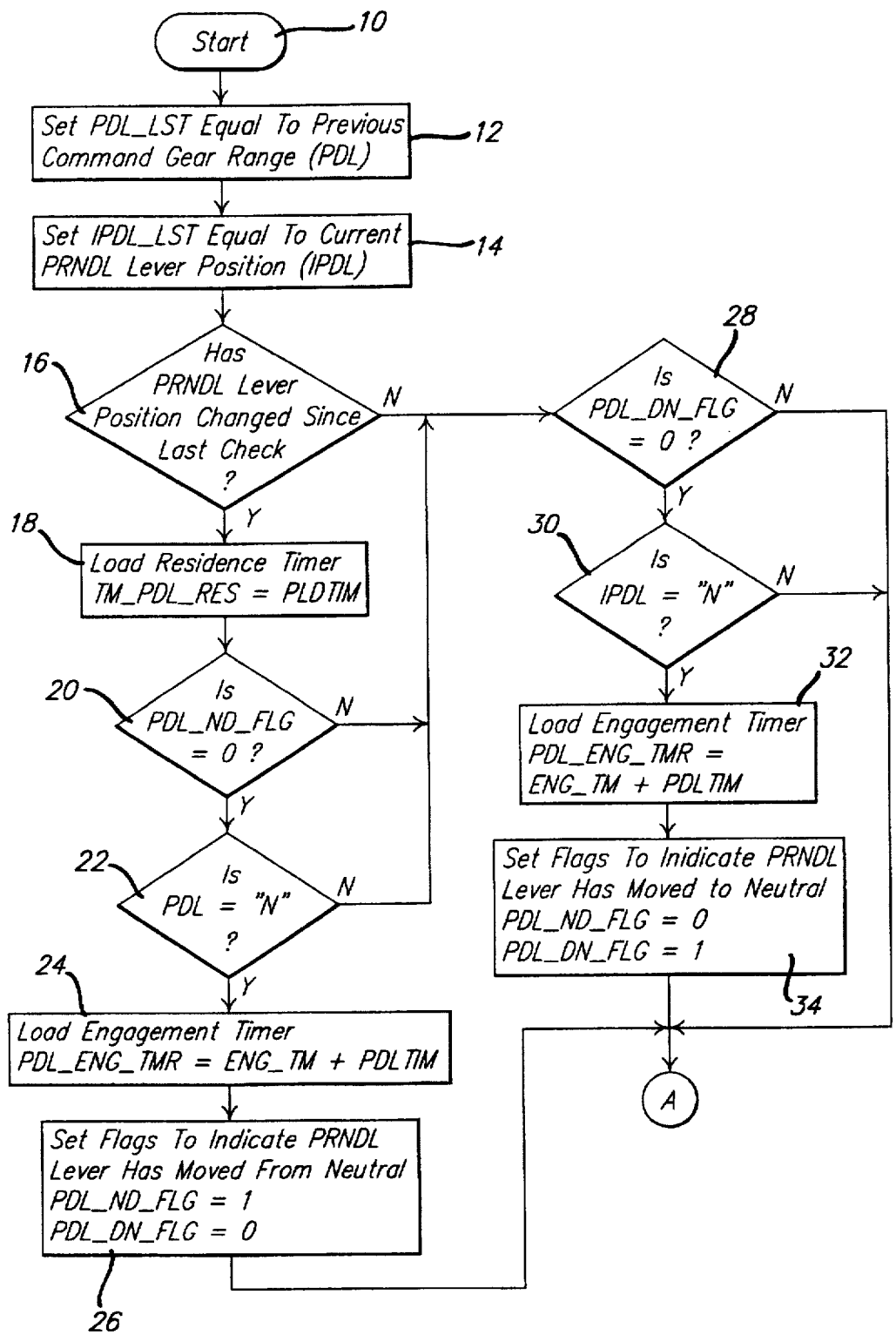

The shift solenoids SS1, SS2, SS3 are energized and deenergized to the on-off states shown in FIG. 2 to produce four forward gears and a reverse gear. The shift selector, controlled by the vehicle operator and referred to as a PRNDL lever, is capable of several ranges, e.g., Drive, First, Second, Reverse and Neutral. The gear selector also has an OD cancel switch controlled by the vehicle operator, which when engaged prevents operation in fourth gear when the PRNDL selector is moved to the D range. In the D or OD range, the four forward gears of the transmission can be produced. In the 2-range, logic present in the hydraulic control circuit prevents engagement of the third and fourth gears but permits engagement of the first and second gears. When the PRNDL selector is moved to the R position, only reverse gear results. The combined states of the shift solenoid valves results in each of the gears of the transmission shown corresponding to the PRNDL range and the state of the OD cancel switch.

Stored in electronic computer memory accessible to the central processing unit is a gearshift schedule relating vehicle speed to throttle position, usually stated in terms of the number of throttle position counts produced by the throttle position sensor. An example of this schedule is represented graphically in FIG. 4 of U.S. Pat. 5,233,523. Each of these counts corresponds to the extent to which the engine throttle fully opens the engine manifold. The gearshift schedule defines ranges for operation in each of the four forward gears of the transmission and lines between these ranges where upshifts (1-2, 2-3, 3-4) and downshifts (2-1, 3-2, 4-3) are commanded when a current operating condition of the powertrain, represented by a point on the chart. The abscissa is vehicle speed and the ordinate is throttle position. When the current operating condition crosses the 1-2 upshift line separating the first gear range from the second gear range, then second gear is commanded. Similarly, when the transmission is operating in third gear and the current operating condition crosses the 3-4 upshift line, then fourth gear is commanded. Control logic in the form of algorithms stored in memory are executed and ultimately produce a command from the CPU to the solenoid-driver circuits which energize selectively the three shift solenoids in accordance with the combination of states for the shift solenoids required to produce the commanded gear ratio. Similarly, when the transmission is operating in fourth gear and a current operating point defined by the current vehicle speed and current throttle position crosses the 4-3 downshift line, a downshift to third gear is commanded.

Figure 5B:
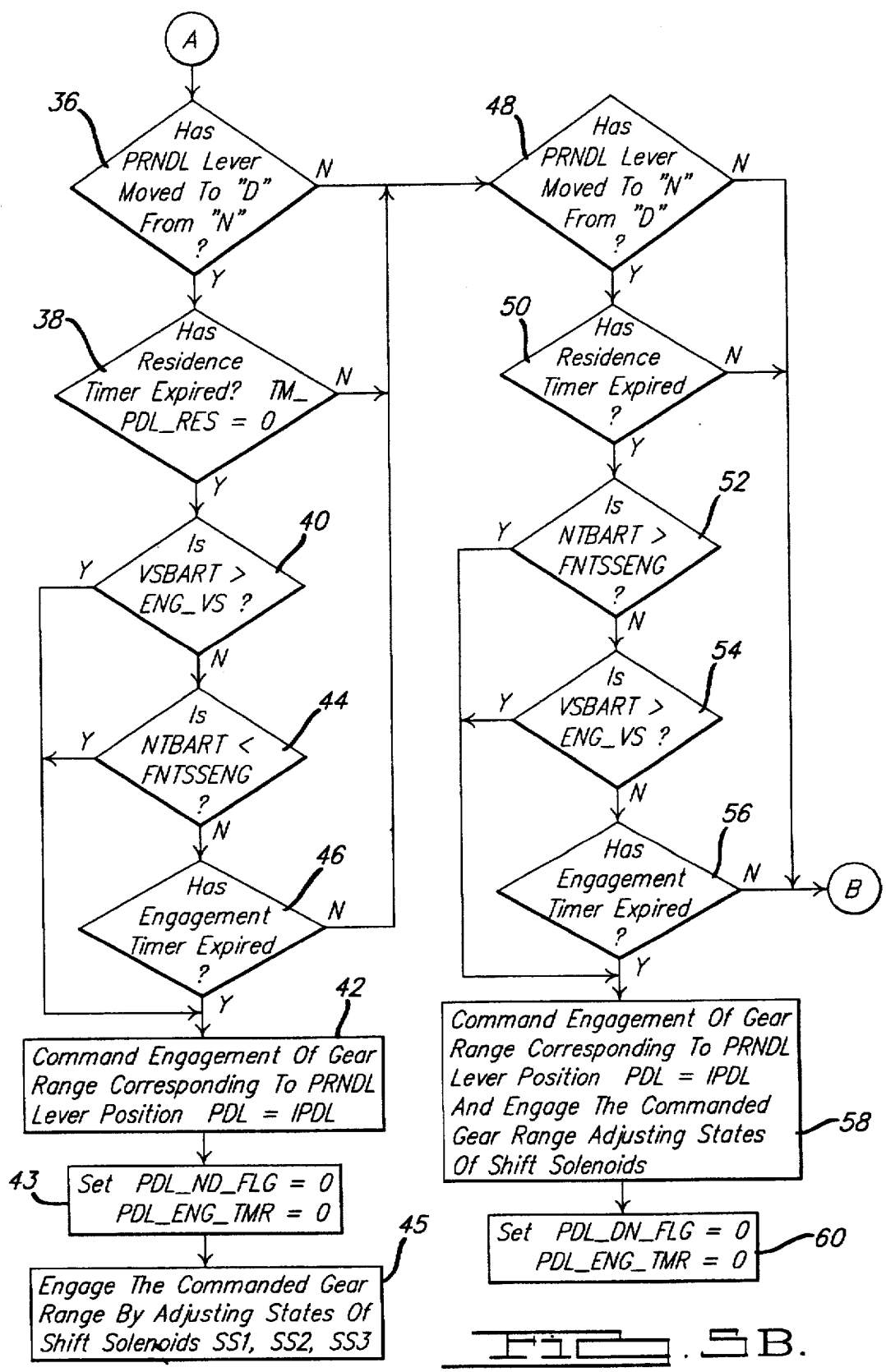
FIG. 5 is a logical flow diagram representing the control algorithm for controlling the shift solenoids according to the present invention.
Figure 5C:
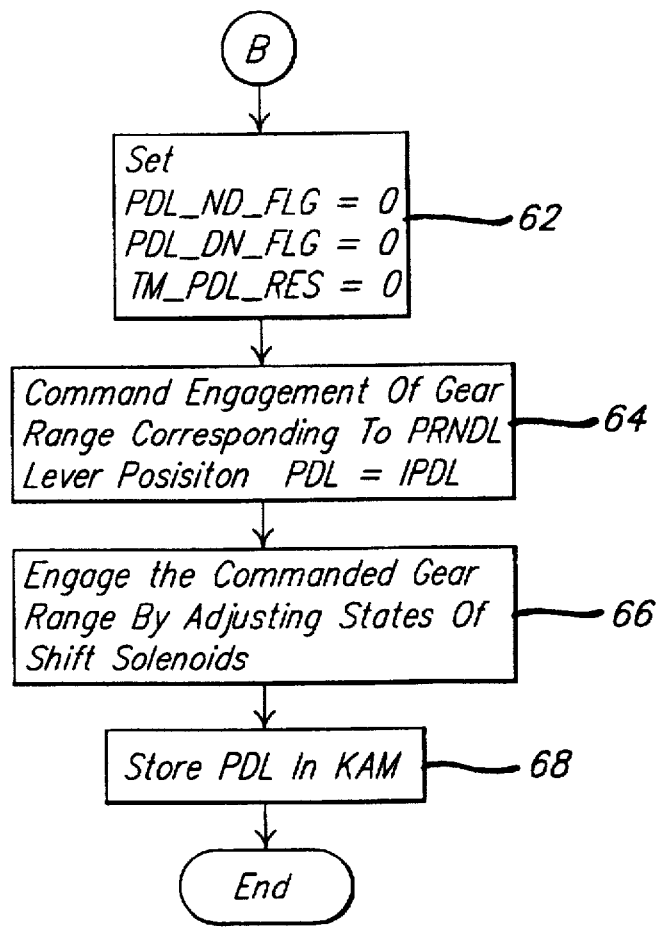

FIG. 5 outlines a control algorithm, according to this invention, for recognizing movement of a PRNDL lever in vehicles equipped with automatic transmissions. The control strategy represented in FIG. 5 is a software module executed each 25 ms, approximately twice the frequency of each background loop.

After starting execution of the control algorithm at 10, a variable PDL_LST is set equal to the immediately preceding commanded gear range PDL at step 12. The commanded gear range is an output signal produced by the CPU of the microprocessor such that the output driver circuit adjusts the states of shift solenoids SS1, SS2 and SS3 to produce a gear range corresponding to the range selection lever position by adjusting the states of the shift solenoids SS1, SS2 and SS3, as illustrated in FIG. 2. At step 14, variable IPDL_LST is set equal to the instananeous lever position, IPDL. FIG. 3 shows the correlation between the states of the five switches associated with each of the selectable ranges, among which the manual range selection lever moves, and the value of the variable IPDL, which represents the instantaneous PRNDL lever position. The switch inputs provide 12 volts to the microprocessor input when closed. Each switch closes when the indicated position is high, i.e., at 12 volts potential. For example, when the range selection lever is in the drive position, ITSD is 12 volts. When ITSD is high, the CPU pin is high, and ITSD is equal to 1. Each time there is a transition of the position of the lever, as indicated by the inquiry at step 16, a residence timer TM_PDL_RES, a countdown timer, is initialized to a calibrated delayed period PDLTIM at step 18. Preferably, PDLTIM is approximately 0.3 sec.

Next, an inquiry is made at 20 to determine whether the lever position has changed from the neutral position to the drive position since the last check was made while executing this algorithm. At step 22, an inquiry is made to determine whether the last lever position, PDL-LST, is neutral. If both statements 20 and 22 are true, control passes to 24 where an engagement timer is initialized with a period that is the sum of an engagement timer period ENG_TM, approximately 3 seconds, and the residence timer period PDL_TIM. Thereafter at 26, flags are set to indicate that the PRNDL lever has moved from the neutral position to the drive position, i.e., PDL_ND_FLG is set equal to 1 and PDL_DN_FLG is set equal to 0.

If statements 16, 20 or 22 is false, control passes to step 28 to determine whether the position of the lever has moved to the neutral position. At step 28 the magnitude of the corresponding flag is compared to 0, and at 30 whether the instantaneous position of the lever is the neutral position. If both statements 28 and 30 are true, control passes to 32 where the engagement timer is initialized to a period of approximately 3.3 seconds. Thereafter, at 34, flags are set to indicate the PRNDL lever has been moved to the neutral position from the drive position.

A third part of the control strategy, in which the PDL signal is passed through to the microprocessor gear ratio control to change the states of the shift solenoid so that a gear ratio of the transmission corresponds to the range position of the lever, begins at step 36. There inquiry is made to determine whether the lever has moved to the a forward drive position from the neutral position by inquiring whether the flag PDL_ND_FLG=1. If that statement is true, control passes to statement 38 where it is determined whether the residence timer has expired. If both statements 36 and 38 are true, at 40 a check is made to see whether filtered vehicle speed, VSBART, is greater than the engagement vehicle speed, ENG_VS. If that statement also is true, the value of PDL is set equal to the value of IPDL, thereby commanding engagement of the range corresponding to the lever position. Statement 42 can be executed even if statement 40 is false, provided either statement 44 or 46 is true. At 44, a check is made to determine whether filtered torque converter turbine speed NTBART is less than FNTSSENG. At statement 46, a check is made to determine whether the engagement timer has expired. FNTSSENG is a callibratable turbine speed stored in computer memory as a function of transmission fluid temperature, TOT, expressed in degrees of Fahrenheit. An example of the function table as illustrated in FIG. 4.

If either statement 36 or 38 is false or if none of the statements 40, 44 or 46 is true, control passes to a portion of the algorithm that deals with movement of the shift lever from drive to neutral. However if statements 36 and 38 are both true and any of the statements 40, 44 or 46 is true, after PDL is passed through to the microprocessor at 42, at 43 the PDL_ND_FLG is set equal to 0, and the engagement timer is zeroed. Thereafter at step 45, the microprocessor produces output signals to the shift solenoids, which produces a gear ratio of the transmission corresponding to the PDL value.

If control passes to statement 48, a similar logic to that described immediately above is executed with respect to determining whether the lever has moved to the N position from the D position and whether, at statement 50, the residence timer has expired. At 52, a check is made to determine whether filtered turbine speed exceeds the engagement turbine speed, as derived from the function of FIG. 4. At 54, a check is made to determine whether filtered vehicle speed exceeds engagement vehicle speed. At 56, a check is made to determine if the engagement timer has expired. These steps can direct control to 58 where PDL is set equal to IPDL, which action commands engagement of the gear corresponding to the lever position, and ultimately produces engagement of that commanded gear by adjusting the states of the shift solenoids, as previously described. Thereafter at 60, the engagement timer is zeroed and flag PDL_DN_FLG is set equal to 0.

At step 62, the residence timer is zeroed and the flags indicating movement of the lever from neutral to drive or from drive to neutral are both set equal to 0. At step 64, the instantaneous position of the lever is set equal to PDL and passed through to the microprocessor, which action ultimately produces a commanded engagement of a gear ratio corresponding to the lever position. Following this at step 66, the commanded gear range is engaged by adjusting the state of the shift solenoids. Finally at 68, the PDL value is stored in keep alive memory KAM in case there is reinitialization.

The form of the invention shown and described herein constitutes the preferred embodiment of the invention; it is not intended to illustrate all possible forms thereof. The words used are words of description rather than of limitation, and various changes may be made from that which is described here without departing from the spirit and scope of the invention.

We claim:

1. A method for controlling an operating range of an automatic transmission with the aid of a digital computer in response to movement of a range selection lever, comprising the steps of:

continually determining at frequent intervals a position of the range selection lever;

initiating a first interval timer in said computer for a first predetermined period upon a change in position of the range selection lever since the last interval;

initiating a second interval timer in said computer for a second predetermined period upon the change in position of the range selection lever from a predetermined position;

setting a first flag in said computer on the occurrence of the change in position of the range selection lever from the predetermined position indicating said change in position and unsetting a second flag;

initiating the second interval timer for the second predetermined period upon the change in position of the range selection lever to the predetermined position;

setting the second flag in said computer on the occurrence of the change in position of the range selection lever to the predetermined position indicating said change in position and unsetting the first flag;

changing the operating range of the transmission to the range corresponding to the set state of the first flag and second flag upon expiration of the first interval timer if the second interval timer has expired.

2. The method of claim 1, further comprising:

providing said computer with a data base including engagement vehicle speed and engagement turbine speed;

continually determining at frequent intervals vehicle speed and turbine speed;

wherein the step of producing the operating range further comprises:

repetitively comparing in the computer at frequent intervals engagement vehicle speed and vehicle speed;

repetitively comparing in the computer at frequent intervals engagement turbine speed and turbine speed;

changing the operating range of the transmission to the range corresponding to the set state of the first flag upon expiration of the first interval timer, provided are of vehicle speed is greater than engagement vehicle speed, engagement turbine speed is greater than turbine speed, and the second interval timer has expired.

3. The method of claim 2, wherein the step of producing the drive range further comprises:

changing the operating range of the transmission to the range corresponding to the set state of the second flag upon expiration of the first interval timer, provided one of vehicle speed is greater than engagement vehicle speed, engagement turbine speed is less than turbine speed, and the second interval timer has expired.

4. The method of claim 2, further comprising:

providing said computer with a data base including a function relating engagement turbine speed and transmission oil temperature;

continually determining at frequent intervals transmission oil temperature; and continually determining in the computer data base at frequent intervals engagement turbine speed from transmission oil temperature.

5. The method of claim 1, further comprising:

providing said computer with a data base including engagement vehicle speed and engagement turbine speed;

continually determining at frequent intervals vehicle speed and turbine speed;

wherein the step of producing the operating range further comprises:

repetitively comparing in the computer at frequent intervals engagement vehicle speed and vehicle speed;

repetitively comparing in the computer at frequent intervals engagement turbine speed and turbine speed;

changing the operating range of the transmission to the range corresponding to the set state of the second flag upon expiration of the first interval timer, provided one of vehicle speed is greater than engagement vehicle speed, engagement turbine speed is less than turbine speed, and the second interval timer has expired.

6. A method for controlling an operating range of an automatic transmission in response to movement of a range selection lever, comprising the steps of:

continually determining at frequent intervals the position of a range selection lever;

initiating a first interval timer for a first predetermined period upon a change in position of the range selection lever since the last interval;

initiating a second interval timer for a second predetermined period upon the change in position of the range selection lever from a predetermined position;

on the occurrence of the change in position of the range selection lever from the predetermined position, producing a first indication of said change in position;

initiating the second interval timer for the second predetermined period upon the change in position of the range selection lever to the predetermined position;

on the occurrence of the change in position of the range selection lever to the predetermined position, producing a second indication of said change in position;

changing the operating range of the transmission to the range corresponding to the first and second indications upon expiration of the first interval timer if the second interval timer has expired.

7. The method of claim 6, further comprising:

determining engagement vehicle speed and engagement turbine speed;

continually determining at frequent intervals, vehicle speed and turbine speed;

wherein the step of producing the operating range further comprises:

repetitively comparing at frequent intervals engagement vehicle speed and vehicle speed;

repetitively comparing at frequent intervals engagement turbine speed and turbine speed;

changing the operating range of the transmission to the range corresponding to the state of the first indication and second indication upon expiration of the first interval timer, provided one of vehicle speed is greater than engagement vehicle speed, engagement turbine speed is greater than turbine speed, and the second interval timer has expired.

8. The method of claim 6, further comprising:

determining engagement vehicle speed and engagement turbine speed;

continually determining at frequent intervals, vehicle speed and turbine speed;

wherein the step of producing the operating range further comprises:

repetitively comparing at frequent intervals engagement vehicle speed and vehicle speed;

repetitively comparing at frequent intervals engagement turbine speed and turbine speed;

changing the operating range of the transmission to the range corresponding to the first indication and second indication upon expiration of the first interval timer, provided one of vehicle speed is greater than engagement vehicle speed, engagement turbine speed is less than turbine speed, and the second interval timer has expired.

* * * * *